United States Patent
Blinn

(10) Patent No.: US 9,871,791 B2
(45) Date of Patent: *Jan. 16, 2018

(54) MULTI FACTOR USER AUTHENTICATION ON MULTIPLE DEVICES

(71) Applicant: Go Daddy Operating Company, LLC, Scottsdale, AZ (US)

(72) Inventor: Arnold Neil Blinn, Hunts Point, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,464

(22) Filed: Feb. 8, 2017

(65) Prior Publication Data

US 2017/0149774 A1  May 25, 2017

Related U.S. Application Data

(63) Continuation of application No. 14/630,363, filed on Feb. 24, 2015.

(51) Int. Cl.
  *H04L 29/06*    (2006.01)
(52) U.S. Cl.
  CPC ...... *H04L 63/0861* (2013.01); *H04L 63/0428* (2013.01); *H04L 63/0838* (2013.01); *H04L 2463/082* (2013.01)
(58) Field of Classification Search
  None
  See application file for complete search history.

(56) References Cited

U.S. PATENT DOCUMENTS

| | | | | |
|---|---|---|---|---|
| 8,522,010 B2* | 8/2013 | Ozzie | ...................... | G06F 21/43 713/155 |
| 9,332,431 B2* | 5/2016 | Reitsma | .............. | H04L 63/0807 |
| 2007/0136581 A1* | 6/2007 | Hoghaug | ................ | G06F 21/31 713/168 |
| 2008/0098464 A1* | 4/2008 | Mizrah | ................... | G06F 21/36 726/5 |
| 2013/0226812 A1* | 8/2013 | Landrok | ............ | G06Q 20/4016 705/67 |
| 2013/0262873 A1* | 10/2013 | Read | ..................... | H04W 12/06 713/186 |
| 2014/0187189 A1* | 7/2014 | Reitsma | .............. | H04L 63/0807 455/404.1 |
| 2014/0189808 A1* | 7/2014 | Mahaffey | ............ | H04L 63/0853 726/4 |

(Continued)

*Primary Examiner* — Trang Doan
(74) *Attorney, Agent, or Firm* — Quarles & Brady LLP

(57) ABSTRACT

Systems and methods of the present invention provide for a first and second client computer configured to receive and transmit an authentication credential and at least one additional authentication credential respectively. The authentication credentials may be selected from authentication credentials known only to a user, identifying a client computer and/or identifying a characteristic unique to the user. A server computer communicatively coupled to the network may be configured to receive the authentication credentials and verify the identity of the user via a match, in a database, of a first authentication credential, a second authentication credential and a third authentication credential.

16 Claims, 3 Drawing Sheets

(56) References Cited

U.S. PATENT DOCUMENTS

2014/0289833 A1* 9/2014 Briceno .................. H04L 63/08
 726/7
2014/0331282 A1* 11/2014 Tkachev ................. H04L 63/08
 726/3
2015/0244706 A1* 8/2015 Grajek .................. H04W 12/06
 726/6

* cited by examiner

MULTI FACTOR USER AUTHENTICATION ON MULTIPLE DEVICES

CROSS-REFERENCE TO RELATED APPLICATIONS

This application is a continuation of U.S. patent application Ser. No. 14/630,363, filed Feb. 24, 2015, and titled MULTI FACTOR USER AUTHENTICATION ON MULTIPLE DEVICES.

FIELD OF THE INVENTION

The present invention generally relates to the field of user authentication and specifically to the field of a multi-factor authentication via multiple client devices.

SUMMARY OF THE INVENTION

The present invention provides systems and methods comprising: a first client computer communicatively coupled to a network and configured to receive and transmit an authentication credential selected from a plurality of authentication credentials comprising: a first authentication credential known only to a user; a second authentication credential identifying a client computer; and a third authentication credential identifying a characteristic unique to the user. The present invention may further comprise a second client computer communicatively coupled to the network and configured to receive and transmit at least one additional authentication credential selected from the plurality of authentication credentials. The present invention may also comprise a server computer communicatively coupled to the network and configured to: receive, from the first client computer, the authentication credential; receive, from the second client computer, the at least one additional authentication credential; and verify the identity of the user via a match, within a database communicatively coupled to the network, to the first authentication credential, the second authentication credential and the third authentication credential.

The above features and advantages of the present invention will be better understood from the following detailed description taken in conjunction with the accompanying drawings.

DETAILED DESCRIPTION

Figure 1:
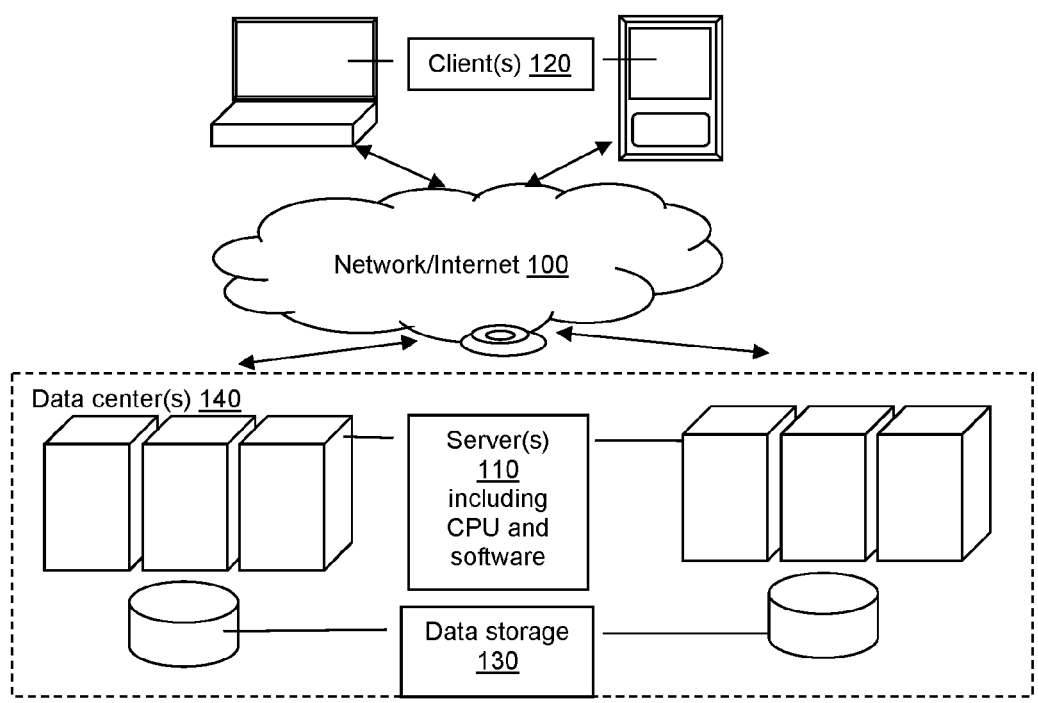
FIG. 1 illustrates a possible system for authenticating a user via multi-factor authentication on multiple devices.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single web page, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Due to the security problems inherent in phishing and other means of cyber attacks, users and administrators are seeking new ways to authenticate users when accessing online data, such as by verifying users' identities and other personal data. One means of protecting this information is via two-factor authentication, where two types of authentication are entered into a single interface on a single client machine in order to verify the identity of a user. As a non-limiting example, the two types of authentication required to verify the user's identify may include something the user knows, as well as something the user has.

As a non-limiting example of two-factor authentication, a user may log into a website and be prompted for a user name and password. Once the user name and password have been entered and verified, a message in Short Message Service (SMS) format, such as a verification code, may be sent to the user, possibly on a mobile device such as a cell phone. The user, after receiving this message, may then be prompted to enter the verification code into the original website via the original client machine to confirm what the user knows (the user name and password) combined with what the user has (the cell phone).

Applicant has identified multiple weaknesses in such presently existing systems and methods, which do not effectively authenticate the user and may leave the user vulnerable to hackers or other unscrupulous individuals as described above. As a non-limiting example, in two-factor authentication systems entered into a single website on a single client machine, there is no protection against some types of cyber attacks.

These types of attacks may include, as non-limiting examples, a key sniffer attack or a man in the middle attack, where an unscrupulous individual operates a website between the user and a valid website host. This unknown interim website may be configured to intercept the input login information (e.g., user name/password), then may relay that information to the valid website host, effectively spoofing the login process by logging the user in as a legitimate website hosted by the website hosting provider.

In this context, spoofing may refer to creating a web page, email or other interface which makes the user and/or web host believe that the login page interface is, in fact, from the original and legitimate source. This login page interface may then be presented to the user, and the user, trusting what appears to be the original and legitimate login page, may enter their login credentials (i.e., user name and password). This critical user information may then be forwarded to the interim website as described above.

Another weakness with current two-factor authentication systems and methods is that, as noted above, they rely on only two factors: something the user knows (e.g., user name/password) and something the user has (e.g., a cell phone, where the user gets an SMS message). Additional weaknesses with current two-factor authentication approaches include both the first and second authentication being entered into the same source, such as a single website interface and/or the same machine.

For example, a user may enter, via their client machine, their user name and password on a login page of a website. This information may be sent to a server operated by the hosting provider of the website. This server may then generate a second authentication code for the user and send it via SMS to the user's phone, as described above, while concurrently or subsequently generating a second web page from the website for the second authentication code, which may be transmitted and displayed on the user's original client machine. The user may then enter the second authentication code from their phone into this second web page (or in some cases, the original web page) and transmit it from the same machine for authentication.

Because the two authentication factors are both entered into and sent from the same machine to the same authority (i.e., the first factor and second factor are both entered into and sent on the same device), a successful phishing attack would allow the man in the middle to access both authentication factors simultaneously, since the user would send the information to the same source through the same channel via the same device.

By spoofing the valid website, and intercepting the credentials between the user and the website host (i.e. in front of the website host), both the user name/password entry and the SMS entry would be more easily accessible, to the man in the middle and therefore easier to intercept. The current state of the art for two-factor authentication, therefore, protects the user against hackers compromising some credentials, but does not protect the user against someone spoofing the infrastructure of the web hosting provider.

Thus, regardless of the means of entering any of the factors disclosed above, the hosting provider has no way of ensuring that the factors have, in fact, originated from the actual user. Conceivably, a man in the middle or other dishonest individual could steal a password or a PIN to get access to one or more means of authenticating the individual, and could impersonate them without alerting the hosting provider that the information is not coming from a valid user. Applicant has therefore determined that optimal systems and methods will provide for entry of a second or subsequent authentication credential into a second or subsequent device through a second or subsequent channel.

In some two-factor authentication systems and methods, a thumb print or other biometric may be used to authenticate a user. However, a similar problem exists in these methods. The biometric, such as a thumb print signature, is static. This means that once an unscrupulous individual gains access to the biometric, they could store and replay it for their own purposes. Applicant has therefore further determined that, in addition to two factors entered into two separate client devices, optimal systems and methods will incorporate at least three and possibly multiple additional authentication factors, possibly including a thumb print or other biometric, thereby introducing three or more factor authentication comprising any combinations of something the user knows (e.g., password), something the user has (e.g., a mobile phone) and something the user is (e.g., a thumb print).

The additional verification of a biometric within such systems or methods confirms that the user is in control of the scanned biometric (e.g., by combining the biometric with a password or other credential), or that the user is not a hacker who has simply obtained a copy of the scanned biometric and is replaying it to gain access to sensitive information (e.g., by requiring verification that the thumb print actually came from the user's phone). The hosting provider may also benefit from such optimal systems and methods, since there is a greater assurance that the information is coming from a valid user.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
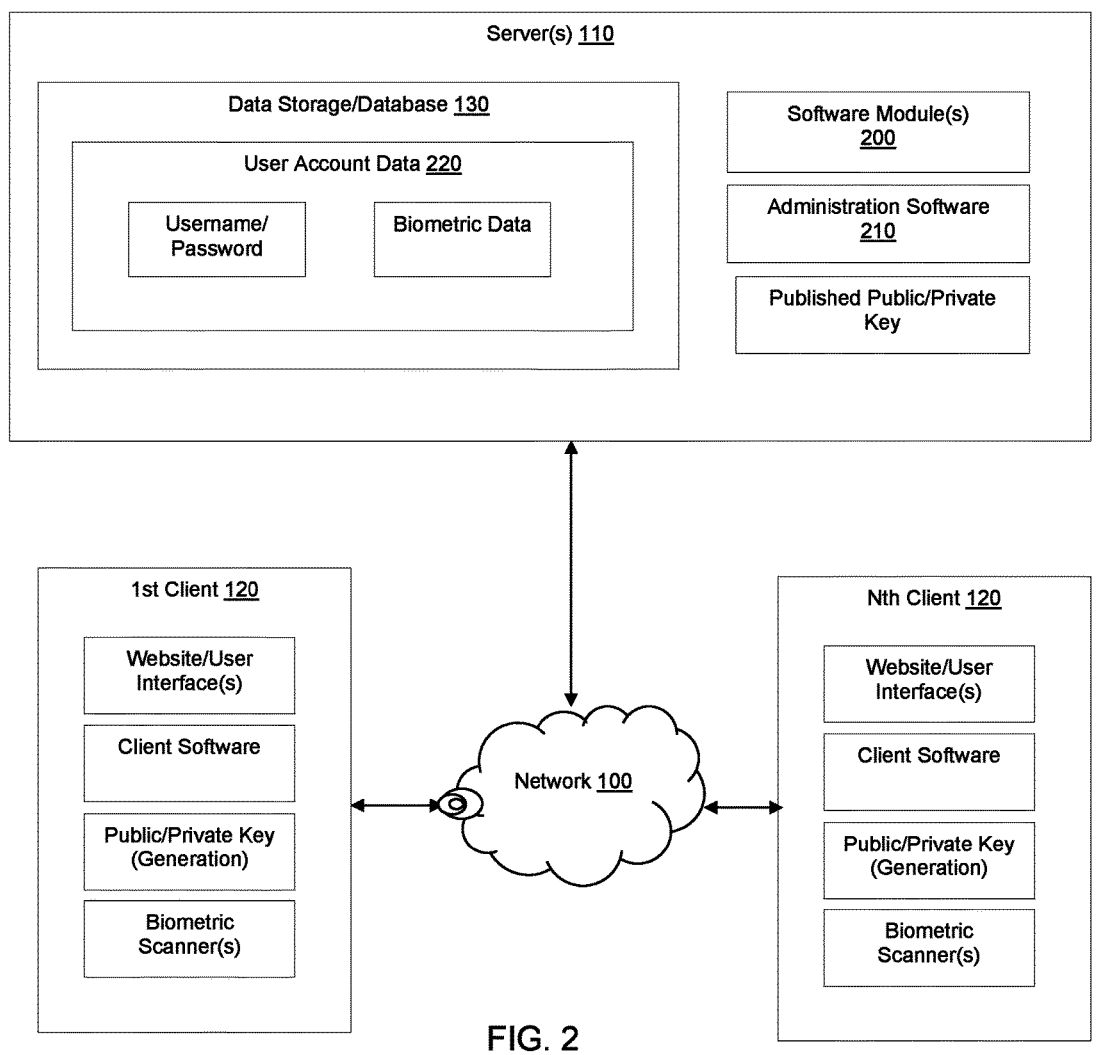
FIG. 2 illustrates a more detailed possible system for authenticating a user via multi-factor authentication on multiple devices.

FIG. 2 shows a more detailed example embodiment of an environment for the systems, and for accomplishing the method steps, disclosed herein. As non-limiting examples, all disclosed software modules 200 may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, software applications running on server(s) 110, client(s) 120 mobile devices may run a user administration program 210 such as GoDaddy's My Account control panel for management of hosting websites and managing domain names, as a non-limiting example.

In such an administration control panel program, or admin 210, each user may be assigned a user id. This user id may identify transactions performed by each user, or other data, such as authentication information disclosed herein. These transactions, user account data 220, authentication data and/or other data may be stored as data records in data storage 130, each data record including the user id to associate the user with the relevant user or other data in data storage 130.

The admin 210 may include or be associated with a Domain Control Center (DCC) for administration of domain names registered to the user. As non-limiting examples, the DCC may include means for listing and managing all domain names registered to the registrant, possibly including auto renewal of the domains, DNS record settings, etc. In some embodiments, the DCC may be used to display the disclosed notices, reports and/or domain name purchase offers, as described in more detail herein.

The disclosed multi authentication methods and system described herein may be applied to authentication of users to any application requiring user authentication including, but not limited to, a bank account, a shopping site, private health records, the admin described above and/or the DCC or other applications. The use of multi authentication input via multiple client devices 120 may provide additional security to the user's personal accounts and/or the domain names registered and managed by users associated with the user account via the DCC.

The security features available may be used in any context providing users repeated access to destructive or semi-destructive actions available via multi factor authentication. As non-limiting examples, this multi factor authentication may be applied at any point in the domain name registration or administration process. Thus, the multi authentication techniques described herein may provide better security as the user: registers a domain name; transfers a domain name; locks a domain name; lists a domain name for sale; cancels a domain name; changes name servers for a domain name; changes the DNS settings for a domain name; etc. Any of the multi factor authentication means, factors, requests, challenges and/or credentials described below may be used to provide greater security for these user account.

Multi factor authentication may comprise multiple types of authentication. As non-limiting examples, a user may request that server(s) 110 perform a particular action, such as accessing and/or updating secure information, such as the bank account data, shopping session data, medical records, domain name data or other domain name or user data previously mentioned. Prior to performing these actions, server(s) 110 may require one or more authentication factors to verify the user's identity before proceeding. These authentication factors may comprise authentication challenges (i.e., a request for user information to verify their identify) and/or authentication credentials (i.e., the response from the user verifying their identity). Authentication factors, challenges and/or credentials may fall into three general categories, possibly including, but not limited to 1) something the user knows; 2) something the user possesses; and 3) something that the user is.

The disclosed invention comprises means for verifying a user via multi-factor authentication, and may include any combination of authentication means, factors, requests, challenges and/or credentials now known or developed in the future, including any combination of the non-limiting example embodiments disclosed herein.

As non-limiting examples, authentication factors may include, but are not limited to: any combination of user names and passwords; software generated codes or passwords; Time-based One Time Passwords (TOTP); shared secrets; private/public key pairs (and related hashing or cryptographic algorithms); unique data associated with the user of the disclosed system (e.g., biometrics specific to a user); authentication via facial recognition; authentication via voice authentication; and/or authentication via tap codes.

In embodiments where authentication factors comprise a combination of user names, passwords and/or a shared secret, a user interface, possibly generated by server(s) 110 and displayed on client(s) 120, may comprise an authentication challenge requesting the user name, password and/or shared secret. A shared secret may comprise data, known only to the parties involved, in a secure communication. As non-limiting examples, a shared secret may comprise a password, a passphrase, a big number or an array of randomly chosen bytes. The user may provide the response to the authentication challenge (something the user knows) to confirm and authenticate their identity.

After the user submits the user name, password and/or shared secret, server(s) 110 may then authenticate the user and proceed with the action requiring the authentication, possibly by confirming a match for the user name, password and/or shared secret via user or other records stored in the user account data 220 in data storage 130. If not authenticated, an alert may be transmitted and displayed to the user.

In embodiments where an authentication factor comprises a code generated by software running on server(s) 110 and/or client(s) 120, a user interface, possibly generated by server(s) 110 and displayed on client(s) 120, may comprise an authentication challenge requesting the previously disclosed shared secret and/or any other algorithm that computes a one-time password from a key and the current time (e.g., CAPTCHA). The user may provide the response (something the user knows) to confirm their identity.

After the user submits their response to the shared secret or generated code (possibly by acknowledging the code, repeating it and sending it back), server(s) 110 may then authenticate the user and proceed with the action requiring the authentication, possibly by confirming a match for the generated code. If not authenticated, an alert may be transmitted and displayed to the user.

In embodiments where an authentication factor comprises a private/public key pair, software on server(s) 110 and/or client(s) 120 may generate private/public key pairs comprising two separate and different keys that are mathematically linked. These keys may behave according to any private/public key algorithms known in the art. As non-limiting examples, the public key may encrypt a message and/or verify a digital signature and the private (secret) key may decrypt the message and/or create a digital signature.

In some embodiments, one or both of these keys may be generated on, and sent from, a first device (e.g., client 120—something the user has) to a second device (e.g., sever 110) to verify authentication by: processing a message with a private key to produce a digital signature; processing the digital signature value with the public key; and comparing that result with the message.

In embodiments where an authentication factor comprises a unique data associated with the user (something the user is), a non-limiting example of this unique data may comprise biometric data associated with the user. Such biometric data may comprise any biometric data collected about the user, and may be gathered from, as non-limiting examples, a thumbprint scanner, a capillary distribution scanner, a retinal scanner, a DNA scanner, an implanted microchip, and/or any other means of gathering biometric data identifying a specific individual now known or discovered in the future. In some embodiments, this biometric data may be acquired and sent from a first device (e.g., client 120, something the user has) to a second device (e.g., sever 110).

After the user or client submits the unique data associated with the user, server(s) 110 may then authenticate the user and proceed with the action requiring the authentication, possibly by confirming a match for the biometric data via user or other records stored in data storage 130. If not authenticated, an alert may be transmitted and displayed to the user.

In embodiments where an authentication factor comprises facial recognition technology, software running on users' client(s) 120 may work in conjunction with on-board or attached cameras to verify user identity using any facial recognition techniques, methods or systems known in the art.

In embodiments where an authentication factor comprises voice recognition technology, software running on users' client(s) 120 may work in conjunction with on-board or attached microphones to verify user identity using any voice recognition techniques, methods or systems known in the art.

In embodiments where an authentication factor comprises tap code technology, software running on users' client(s) 120 may be configured to work in conjunction with sensors on the client(s) 120 to receive a series of Morse-code or other style tapped input to verify user identity using any tap code techniques, methods or systems known in the art.

The disclosed invention represents a significant advantage over existing multi factor authentication. In this multi-factor authentication, server(s) 110 may generate and/or access a first authentication request and/or challenge, possibly to be displayed on a user interface. As a non-limiting example, such a challenge may comprise an interface displayed on a web page, and configured to receive a user name/password combination from a user.

Server(s) 110 may then transmit this first authentication challenge to one or more client(s) 120. Client(s) 120 may then display the first authentication challenge on the user interface. In response to the authentication challenge, a user may enter, as non-limiting examples, the user name and/or password into the user interface.

Client(s) 120 may then transmit the first authentication credential, entered by the user, to server(s) 110. One or more software module(s) 200 running on server(s) 110 may then be configured to receive the first authentication credential entered and submitted by the user, and use the entered credential(s) to authenticate the user, possibly by comparing the entered credential against username, password, temporary password, public/private key and/or biometric data stored as user account data 220 on server(s) 110 and/or in data storage 130. If the first credential is not authenticated, an alert may be generated, transmitted and displayed on client(s) 120 to the user.

If the first authentication credential is authenticated: the server may generate and/or access a second authentication challenge, to be displayed, possibly on the user interface. As non-limiting examples, the second authentication challenge may comprise a message/digital signature generated, encrypted and/or decrypted using a private/public key pair and/or a biometric scan. Server(s) 110 may then transmit this second authentication challenge to client(s) 120, possibly to a client 120 different than the client on which the first authentication credential was authenticated.

In response to the second authentication challenge, the user, or software running on the user's client machine, may submit and/or transmit, to server(s) 110, a second authentication credential to authenticate the user. As non-limiting examples, this second authentication credential may comprise the private/public key pair message and/or the user's biometric. As a non-limiting example, the biometric may be signed by the private key on client(s) 120 and sent to server(s) 110 to verify it was collected on a valid device.

One or more software module(s) 200 on server(s) 110 may be configured to receive the second authentication credential submitted by the client(s) 120 and authenticate the user via the second authentication credential, possibly by comparing the data against a user name, password, temporary password, public/private key and/or biometric data stored as user account data 220 on server(s) 110 and/or in data storage 130, as disclosed above. If the second credential is not authenticated, an alert may be generated, transmitted and displayed to the user on client(s) 120. If the second factor is authenticated, the server may proceed with the process for which authentication was required.

This multi-factor authentication is not limited to two or three factors, and the verification process above may be repeated for each additional factor until all authentication challenges and credentials have been verified and authenticated.

In some embodiments, authentication of a user may be augmented by requiring that a second, third or nth authentication credential be entered or verified via a second, third or nth channel and/or a second, third or nth device.

As a non-limiting example, a user may not be authenticated until software, possibly running on server(s) 110, verifies that the authentication for a subsequent authentication credential is received from a different channel than the channel used to submit and/or transmit the initial or previous authentication credential(s). Non-limiting examples of such channels may include user interfaces displayed via URLs, websites, web pages, software or other apps running on client(s) 120, etc., which are different from the initial or previous URLs, website(s), web page(s), software or other app(s), possibly running on and/or received via a different device than the initial or previous device.

For example, if a first authentication credential was entered into a user interface displayed via a first web page on a first website found at a first URL running on a first browser and/or operating system on a first client 120, the software may be configured to determine if the second/nth authentication credential is also received via same channel (e.g., the web page, website, URL, browser and/or operating system), possibly via the same client 120. If so, the user may not be authenticated and the software may require the user to enter one or more subsequent authentication credentials via one or more different channels (web page, website, URL, browser and/or operating system) than the first or previous channel used to enter the initial or previous authentication credential.

Similarly, a user may not be authenticated until software, possibly running on server(s) 110, verifies that authentication for a subsequent authentication was received from one or more different devices than the device used to submit and/or transmit the initial or previous authentication credential(s). Non-limiting examples of such devices may include any client 120 and/or server 110 device disclosed herein.

In a similar example to that above, if a first authentication credential was entered via a client 120 laptop or desktop computer, the software may be configured to determine if the second/nth authentication credential is also received via the same device. If so, the user may not be authenticated and may be required to enter one or more subsequent authentication credentials via a different device than that used to enter the initial or previous authentication credential.

In some embodiments, the second or nth device may be authenticated via an exclusive channel available between the client(s) 120 and server(s) 110 via a private/public key pair specifically identifying the client(s) 120 and authenticating the authentication credential via the exclusive channel. Details of such private/public key pairs and exclusive channels are disclosed below.

In some embodiments, the requirements for different channels and/or devices may be combined, so that a first authentication credential may be entered via a first channel into a first device and a second authentication credential may be required to be entered via a second channel into a second device. If additional authentication credentials are involved, the nth security credential may be required to be entered via the nth channel into an nth device, and so on.

The second and/or nth device may also act as another form of authentication, specifically something the user has. In some embodiments, an authentication message, authentication code and/or any other authentication challenge (possibly including a user alert, as disclosed below) may be sent to a first client 120 device, while a second message, code and/or challenge is transmitted to a second client 120 device. In some embodiments, this message may indicate that the user has attempted to log in on the first or previous device, and is now seeking a second or nth authentication of the user's identity, and may display an alert that action is required on the part of the user to authenticate the user and continue the login. The user's response to the second authentication challenge via the second client device (by providing a second authentication credential) may act as further verification of the user's identity by providing something the user knows combined with something the user has. In some embodiments, disclosed below, the software running on server(s) 110 and/or client(s) 120 may verify the user without additional interaction with the user.

The authentication message, code and/or challenge transmitted to the user may be communicated by any means known in the art. As non-limiting examples, the message, code and/or challenge may be communicated via: a web page; an email; an SMS/text message; software running on a client computer 120; an app running on a mobile device; a phone call, a voice message on a phone; etc. Communication means such as SMS/text, phone messages, etc. may provide broader means to send the message, code and/or challenge, since the message, code and or challenge would not rely on proprietary hardware and/or software to transmit to the user.

Server(s) 110 may generate, and transmit an authentication message, code and/or challenge to the user's client 120, such as a user's laptop computer, as described above. On receiving this data, the user's client 120, possibly using the software disclosed herein, may issue an alert to the user, such as an audio chime indicating receipt of a new message, or a visual alert such as an alert window displayed on a screen, as non-limiting examples.

When the first message, code and/or challenge is transmitted, a second message, code and/or challenge may be simultaneously or subsequently sent to a user's second client 120, such as the user's mobile device. In this example, the mobile device may be configured to display the message, code and/or challenge, and the user may input the message, code and/or challenge into a user interface on software running on the mobile device.

In some embodiments, when the second challenge is presented, requesting a second authentication credential on the second device server(s) 110 may be configured to generate and transmit additional information with the challenge indicating the action the user intends to perform with the authentication. As a non-limiting example, this action may include authorizing a payment or making an online purchase. Thus, as the alert for the second challenge is received, the message may display an additional message requesting the user to confirm the action the user intends to confirm.

The converse is an equally valid model. Namely, server(s) 110 may generate and transmit the first message, code and/or challenge, possibly including the alert, to the user's mobile device while simultaneously or subsequently sending the second message, code and/or challenge to the user's desktop or laptop computer. Thus, any client 120 disclosed herein may act as either the first or second device to which the message, code and/or challenge is communicated, but the response and/or authentication credentials may be required to be entered into separate client devices 120.

In some embodiments, a code may be displayed on a first client 120, but then required to be entered via a channel on a second client 120. As a non-limiting example, a code may be displayed on a PC screen with instructions to go to a phone and type the code, then click a button on the phone to encrypt and transmit the code, or conversely, communicate a code to the phone that the user must input (and/or encrypt) on a PC, etc.

In some embodiments, a user may install software on the client(s) 120, to receive the authentication message, code and/or challenge. The software may be, as non-limiting examples, a software application on a desktop or laptop and/or an app on a mobile device. The software may be further configured to establish an exclusive channel between the client(s) 120 and server(s) 110, as described below.

The software may be automatically configured upon installation, to identify the client(s) 120 as something the user owns in order to authenticate the user's identity. Alternatively, a user may configure the software during installation to accomplish the same purpose. In some embodiments, the software may include means for the user to log in to a user account, possibly by providing a username and password.

The software may be configured to receive the incoming message, code and/or challenge. As noted above, the software may be configured to display an alert on the client(s) 120 when the user receives such a message, code and/or challenge. In embodiments requiring user input, the software may then be configured to receive authentication credentials or other acknowledgements from the user.

In some embodiments, the software itself may display the alert and/or code generated by software on server(s) 110 or client(s) 120. The alert and/or code may comprise TOTP, answer to shared secrets, other generated passwords, etc. In these embodiments, SMS, text and or phone messages would not be necessary. In embodiments where the alert, generated code, TOTP, answer to shared secrets, etc. is generated by the software and displayed, the user may simply need to click a button on a user interface to verify receipt of the alert/login attempt and confirm the authentication.

In some embodiments, installation of the software may cause client(s) 120 to automatically generate a private/public key pair, used for private/public key encryption of messages and/or authentication data transmitted between server(s) 110 and client(s) 120. This private/public key pair may act as one of the trusted authentication credentials (i.e., an initial or secondary authentication credential) used to verify the user's identity. As a non-limiting example, the private/public key pair may act as a secondary authentication credential (proof of something the user has) when a user attempts to log in via user name/password as a primary authentication credential (something the user knows).

On installation of the software in these embodiments, the software and/or the client(s) 120 may be configured to generate a unique public/private key pair. The client and/or software may then be configured to store the private key and transmit the public key to server(s) 110 to be stored in the cloud.

In these embodiments, the public key may generate a digital signature and the private (secret) key may sign any data transmitted to the server.

The key in the public key may be installed, published and/or stored the hosting servers 110 in association with the user, the user's client device 120 and/or any other user data. In some embodiments, this association may be accomplished via data records that join data, such as a user id identifying the user, to the published/stored key(s).

Associating the user and client(s) 120 with software and/or data on the server 110 via the private/public key pair may bind each and all of these together, creating authentication as a primary or secondary authentication credential, since code on the client(s) 120 is bound to code on the server(s) 110 via an exclusive encryption channel between client(s) 120 and server(s) 110.

With this exclusive encryption channel established, server(s) 110 may generate and transmit an authentication message, code and/or challenge to client(s) 120, seeking either a primary or secondary authentication. The software on the client(s) 120 may receive this message, code and/or challenge and generate and/or receive a response to the message, which may then be signed by the private key and transmitted to server(s) 110.

In some embodiments, the user may need to enter data to respond to the challenge. In these embodiments, the software running on the client(s) 120 may display a code or other data, which the user must enter before proceeding. In other embodiments, the code or other data may not be necessary. The user may simply click a button on the user interface that either a generated authentication credential is OK, or that the user wants to proceed with the public/private key authentication, where the software client(s) 120 would simply confirm the public/private key encryption channel. Because the code on the client(s) 120 and server(s) 110 are bound together as described above, only this credential would be necessary to proceed.

In entirely automated embodiments, user interaction may not be necessary at all. In these embodiments, the installed software may recognize the incoming challenge and may generate the response including and/or encoded with the necessary digital signature or encryption necessary to authenticate the user and/or the client machine.

Regardless of the means for generating, entering and/or approving the response, once the user response has been created, the software on client(s) 120 may use the key to generate/ the digital signature the software may then transmit the digital signature to server(s) 110 via the exclusive channel between client(s) 120 and server(s) 110 for authentication.

In some embodiments, following authentication of a first authentication factor and a second authentication factor, the disclosed system and methods may require a third authentication factor. In these embodiments, authentication of a user may require three separate authentication factors including 1) something a user knows; 2) something the user has; and 3) something the user is. Any of the previously disclosed authentication factors and/or methods may be used to verify these three separate authentication factors.

Although no authentication system or method is 100% secure, providing a third authentication factor, each factor reflecting a different element in relation to the user greatly enhances the security of the user's authentication. As a non-limiting example, a user may enter a login/password entry or other transaction, possibly on a first device (i.e., entering something the user knows).

A second transaction may comprise a software running on the user's client 120 machine, configured to alert the user to the first transaction and confirm the transaction, possibly via the private/public key on the client 120 (i.e., using the exclusive connection to confirm something the user has). The user may enter data to confirm the transaction, click an OK button displayed on the client(s) 120 to confirm the transaction with the private key on that device and/or allow an installed software to generate a second authentication, possibly including a digital signature, and the response before sending to server(s) 110.

Before generating and/or the /signature, however, the disclosed systems/methods may require the user to enter a biometric (i.e., entering something the user is), and may only generate the signature to confirm the transaction based on the presence of the biometric. For example, where a thumb print or other biometric is used as part of the authentication, the server(s) 110 may be configured to verify the biometric Any of the three types of authentication, including this biometric, may be encrypted and/or digitally signed as disclosed herein prior to transmitting the response to server(s) 110.

Thus, if the user's phone were stolen, and a thief was to already know the user's one username/password authentication, the user's authentication may compromised. The thief would be able to confirm any transaction if they have both the phone and the username/password. However, using three factor authentication, the username/password, device (possibly including the private/public key pair) and biometric would be required to spoof the authentication, guaranteeing a more secure authentication.

Figure 3:
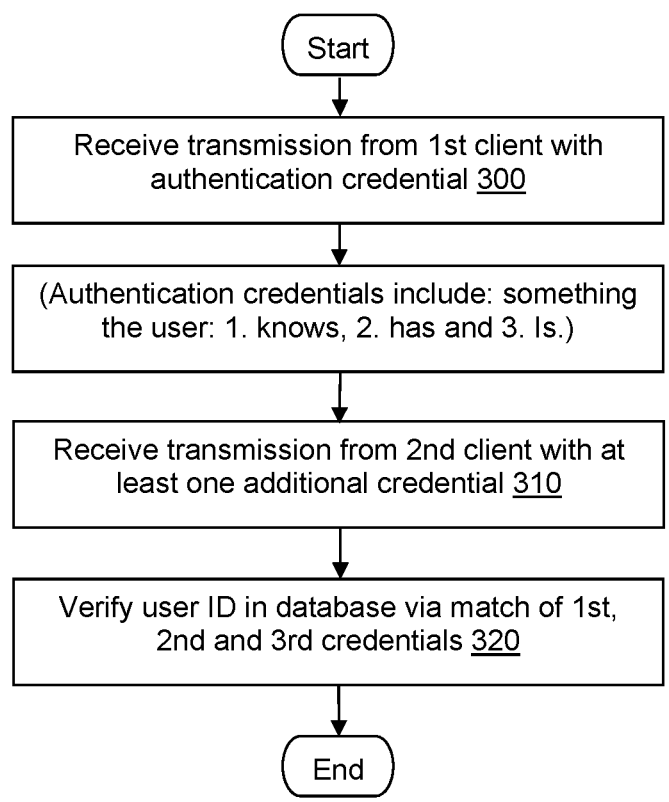
FIG. 3 is a flow diagram illustrating a possible embodiment of a method for authenticating a user via multi-factor authentication on multiple devices.

Several different methods may be used to provide and manage the present systems. FIG. 3 represents a flow diagram for one possible embodiment of the previously described improvements on presently existing systems. In this example embodiment, one or more server computers 110 may be communicatively coupled to the network 100 and may be configured to: receive a first transmission, from a first client computer communicatively coupled to the network, comprising an authentication credential selected from a plurality of authentication credentials comprising: a first authentication credential known only to a user; a second authentication credential identifying a client computer; and a third authentication credential identifying a characteristic unique to the user (Step 300); receive a second transmission, from a second client computer communicatively coupled to the network, comprising at least one additional authentication credential selected from the plurality of authentication credentials (Step 310); and verify the identity of the user via a match, within a database communicatively coupled to the network, to the first authentication credential, the second authentication credential and the third authentication credential (Step 320).

The steps included in the embodiments illustrated and described in relation to FIGS. 1-3 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a server computing device coupled to a network and comprising at least one processor executing specific computer-executable instructions that, when executed, cause the system to:
   identify, in a first transmission from a first authentication user interface (UI) on a first client computing device operated by a user, a first authentication credential input by the user;
   responsive to identifying, within a database coupled to the network, a user identifier associated with the first authentication credential, the database storing a public key and a biometric record signed by a private key and wherein the private key and the public key are configured to bind a first software code on a second client computing device with a second software code on the server computing device to establish an encryption channel:
   generate a second authentication UI requesting a second authentication credential from the user;
   transmit the second authentication UI to be displayed on the second client computing device operated by the user;
   receive, via the encryption channel between the second client computing device and the server computing device, a second transmission from the second authentication UI on the second client computing device;
   identify, in the second transmission the second authentication UI on the second client computing device, the second authentication credential input by the user; and
   responsive to identifying, within the database, the user identifier associated with the second authentication credential input by the user, authenticate the user.

2. The system of claim 1, wherein the first authentication credential or the second authentication credential comprises a time-based one time password or a tap code.

3. The system of claim 1, wherein the computer-executable instructions further cause the server computing device to generate an alert to be displayed on the first client computing device or the second client computing device responsive to a determination that:
   the first authentication credential or the second authentication credential is not associated with the user identifier in the database; or
   the second authentication credential, comprising a biometric input by the user, does not match the biometric record stored in the database.

4. The system of claim 1, wherein the computer executable instructions further cause the server computing device, responsive to a determination that the first client computing device and the second client computing device are the same device, to generate an alert to be displayed on the first client computing device or the second client computing device.

5. The system of claim 1, wherein the authentication of the user authorizes the user to access a domain name administration software, a bank account, a retail website, or at least one private health record.

6. The system of claim 5, wherein the second client computing device is configured to, without user input:
   store a biometric data;
   encrypt the biometric data using a private key; and
   transmit the biometric data to the server computing device.

7. The system of claim 6, wherein, upon authentication of the user, the server computing device is configured to perform a requested action for which the authentication is required.

8. The system of claim 1, wherein the second authentication credential comprises a biometric data including a finger or thumb print, a capillary distribution, or a software identification of the user's face, voice, retina, or DNA.

9. A method, comprising the steps of:
identifying, by a server computing device coupled to a network and comprising at least one processor executing specific computer-executable instructions, in a first transmission from a first authentication user interface (UI) on a first client computing device operated by a user, a first authentication credential input by the user;
responsive to identifying, by the server computing device, within a database coupled to the network, a user identifier associated with the first authentication credential, the database storing a public key and a biometric record signed by a private key and wherein the private key and the public key are configured to bind a first software code on a second client computing device with a second software code on the server computing device to establish an encryption channel:
generating, by the server computing device, a second authentication UI requesting a second authentication credential the user;
transmitting, by the server computing device, the second authentication UI to be displayed on the second computing device operated by the user;
receiving, via the encryption channel between the second client computing device and the server computing device, a second transmission the second authentication UI on the second client computing device;
identifying, by the server computing device, in the second transmission the second authentication UI on the second client computing device, the second authentication credential input by the user;
responsive to identifying, within the database, the user identifier associated with the second authentication credential input by the user, authenticating, by the server computing device, the user.

10. The method of claim 9, further comprising the step of decoding the first authentication credential or the second authentication credential as a time-based one time password or a tap code.

11. The method of claim 9, further comprising the step of generating, by the server computing device, an alert to be displayed on the first client computing device or the second client computing device responsive to a determination that:
the first authentication credential or the second authentication credential is not associated with the user identifier in the database; or
the second authentication credential, comprising a biometric input by the user, does not match the biometric record stored in the database.

12. The method of claim 9, further comprising the step of: responsive to a determination that the first client computing device and the second client computing device are the same device, generating, by the server computing device, an alert to be displayed on the first client computing device or the second client computing device.

13. The method of claim 9, wherein the authentication of the user authorizes the user to access a domain name administration software, a bank account, a retail website, or at least one private health record.

14. The method of claim 13, further comprising the steps of:
storing, by the second client computing device, a biometric data;
encrypting, by the second client computing device, the biometric data using a private key; and
transmitting, by the second client computing device, the biometric data to the server computing device.

15. The method of claim 14, further comprising the step of performing, by the server computing device, a requested action, upon authentication of the user, for which the authentication is required.

16. The method of claim 9, wherein the second authentication credential comprises a biometric data including a finger or thumb print, a capillary distribution, or a software identification of the user's face, voice, retina, or DNA.

* * * * *